United States Patent
Blangetti et al.

[11] Patent Number: 6,145,315
[45] Date of Patent: Nov. 14, 2000

[54] PROCESS AND EQUIPMENT ARRANGEMENT FOR THE PREHEATING AND MULTISTAGE DEAERATION OF WATER

[75] Inventors: Francisco Blangetti, Baden; Hans Eberle, Oberrohrdorf, both of Switzerland

[73] Assignee: Asea Brown Boveri AG, Baden, Switzerland

[21] Appl. No.: 09/336,734

[22] Filed: Jun. 21, 1999

Related U.S. Application Data

[62] Division of application No. 08/760,334, Dec. 4, 1996, Pat. No. 5,930,998.

[30] Foreign Application Priority Data

Dec. 29, 1995 [DE] Germany ............................ 195 49 139

[51] Int. Cl.$^7$ .................................................. F01K 13/02
[52] U.S. Cl. ................................ 60/646; 60/656; 60/657; 60/692; 60/694
[58] Field of Search ............................. 60/685, 693, 692, 60/694, 697, 646, 648, 656, 657; 165/115, 118, DIG. 345

[56] References Cited

U.S. PATENT DOCUMENTS

| | | |
|---|---|---|
| 3,803,436 | 4/1974 | Letvin . |
| 4,241,585 | 12/1980 | Gorzengno . |
| 4,288,989 | 9/1981 | Cassidy . |
| 4,631,925 | 12/1986 | Ohtake et al. ........................ 60/692 X |
| 4,683,025 | 7/1987 | Flores . |
| 4,732,004 | 3/1988 | Brand et al. . |
| 4,748,815 | 6/1988 | Junior et al. ............................... 60/692 |
| 4,776,170 | 10/1988 | Blangetti . |
| 4,810,327 | 3/1989 | Norrmén . |
| 4,813,237 | 3/1989 | Szucs et al. . |
| 4,819,436 | 4/1989 | Ahner et al. . |
| 4,873,829 | 10/1989 | Williamson . |
| 4,969,507 | 11/1990 | Rosenbled . |
| 5,004,043 | 4/1991 | Mucic et al. . |
| 5,246,541 | 9/1993 | Ryham . |
| 5,343,705 | 9/1994 | Athey et al. . |

FOREIGN PATENT DOCUMENTS

| | | |
|---|---|---|
| 957 948 | 8/1956 | Germany . |
| 1 110 615 | 7/1961 | Germany . |
| 4 022 544 | 1/1992 | Germany . |
| 1 000 717 | 2/1983 | U.S.S.R. . |

OTHER PUBLICATIONS

"Entgasung von Speisewasser", Weitere Informationen, cav, Jul. 1991.

Evaporation, Ullman's Encyclopedia of Industrial Chemistry, Fifth Edition, vol. B3, Gerhartz, et al., 1989, pp. 3–28 to 3–32.

*Primary Examiner*—Hoang Nguyen
*Attorney, Agent, or Firm*—Burns, Doane, Swecker & Mathis, L.L.P.

[57] ABSTRACT

In a process for preheating and deaerating make-up water in a power generation plant by steam, the required make-up water is initially heated up to the saturation temperature without substantial deaeration and is subsequently deaerated. The steam used for heating and deaerating is expanded steam from a condenser, which steam is almost fully condensed during the heating of the make-up water and is recycled to the steam circulation of the power generation plant.

4 Claims, 2 Drawing Sheets

PROCESS AND EQUIPMENT ARRANGEMENT FOR THE PREHEATING AND MULTISTAGE DEAERATION OF WATER

This application is a divisional, of application Ser. No. 08/760,334, filed Dec. 4, 1996 now U.S. Pat. No. 5,930,998.

BACKGROUND OF THE INVENTION

1. Field of the Invention

The invention relates to a process for the preheating and multistage deaeration of make-up water in a power generation plant by means of steam. It also relates to an equipment arrangement for carrying out the process.

2. Discussion of Background

The consumption of spent deaerated demineralized water in combined and industrial power station plants is very large. This necessarily leads to the treatment of considerable quantities of make-up water for the purpose of replacing the losses. In this connection, special condenser configurations with mixing preheaters/deaerators are known, which are capable of preheating and deaerating quantities of make-up water of up to 70% of the quantity of the steam released. Normally, not more than 3 to 5% of make-up water, relative to the quantity of steam released, is injected in classic condensing power station plants directly into a condenser. However, massive injection of water adversely affects the condenser pressure, since the condenser bundles are supplied with external water, that is to say, water which does not come from the condensation. The direct injection of make-up water in the condenser would, because of the large quantities mentioned, lead to flooding of the tube bundles. A loss of vacuum would then be inevitable, which represents a considerable impairment of the condenser operation.

Economical preheating and deaeration of large quantities of make-up water is nowadays carried out with steam of the lowest energy level, the overall efficiency of the power station process being adversely affected only to a minimum extent. In order to achieve this object according to the conventional practice, packed columns are installed above the condenser, wherein the expulsion of the gases dissolved in the make-up water takes place with the use of the turbine exit steam as a stripping agent. In this case, the required condenser pressure is maintained with the aid of an additional suction device.

When the make-up water, in most cases trickling in, enters a packed column operated in countercurrent, this make-up water is as a rule subcooled by 10° C. to 18° C. relative to the stripping steam. For ideal deaeration in a packed column, however, approximately thermal equilibrium between the liquid phase and the gas phase is necessary. Because of the demonstrated subcooling, the waste steam must thus initially accomplish the thermal saturation of the make-up water. If the preheating is to take place in a packed column in the same way as the deaeration, the column cross-section of such a packing must be designed with excessive dimensions e.g., be oversized because of the possible flooding risk. The design of a packed column for the such loading is, however, associated with high costs. The steam which, during the preheating of the downward-flowing water, is driven ineffectively through such a packed column, represents an inevitable loss from the water-steam circulation, since efficient deaeration, as mentioned, takes place only after the temperature of the make-up water has approached that of the stripping steam to within less than 1 K. Furthermore, the installation of a further suction device in a water-steam circulation is necessary, if the packed column is also used for the heating of the make-up water.

Effective deaeration is characterized by a deaeration range from 10,000 ppb (parts per billion) of $O_2$, which is the state of saturation of the water with atmospheric air at room temperature, down to single-digit ppb values such as about 5 ppb.

SUMMARY OF THE INVENTION

Accordingly, one object of the invention is to provide a novel process and an associated equipment arrangement for carrying out the process, of the type set forth above, in such a way that the energy balance of the preheating and deaeration of the make-up water by means of waste steam is improved and thus becomes less costly. At the same time a reduction in the loss of stripping steam due to suction during the preheating and deaeration is desired.

It is thus an object of the invention to separately carry out the heating and deaeration of large quantities of make-up water by means of low-energy steam, since deaeration exclusively in the a thermally saturated state of the make-up water, e.g., at approximately the same temperature of the make-up water and the waste steam, is preferable in terms of energy and economics.

A first, preferred embodiment of the invention comprises initially carrying out exclusively the thermal saturation of the make-up water nearby completely in a series arrangement of convective heat transfer devices including a falling-film heat exchanger and a jacket-type heat exchanger, before the deaeration takes place in a packed column. Flooding of a packed column is excluded by the meeting therein of the stripping steam and the make-up water at the same temperature, even with a comparatively small column cross-section.

This embodiment is especially suitable for modification of an existing power station plant.

In a second embodiment of the invention, the substantial heating of the make-up water takes place in an additional convective heat transfer device, a tube bundle of a condenser, and subsequently the deaeration is carried out exclusively in a packed column or a falling-film deaerator. This embodiment variant is particularly suitable for use in a new plant.

The novel process and the novel equipment arrangement have the distinctive feature that, as compared with conventional methods and connections, the overall efficiency of the power station plant is enhanced, since low-energy waste steam is used for preheating and deaerating, this steam being completely condensed and retained for circulation into the condenser with a corresponding release of the condenser from the loads of deaeration and preheating of the make-up water.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein two exemplary embodiments of the invention are diagrammatically illustrated by reference to a preheater/deaerator line for make-up water in a power station plant. In the drawing.

Figure 1:
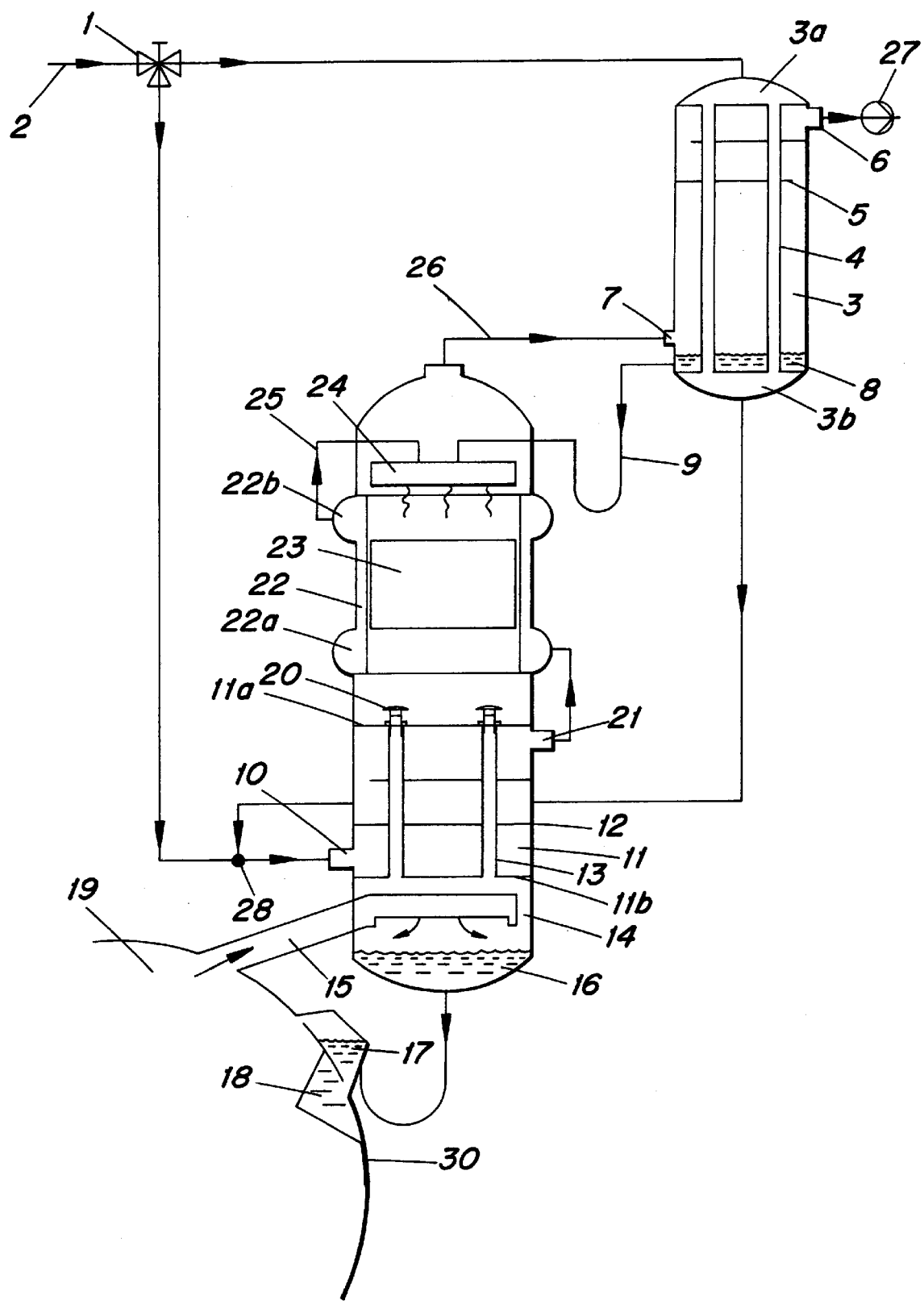
FIG. 1 shows a partial longitudinal section through a condenser with a downstream falling-film heat exchanger, a jacket-type heat exchanger with a packed column and a condenser-stripper unit.

Only the elements essential for the understanding of the invention are shown. Directions of flow of the working media are shown by means of arrows.

DESCRIPTION OF THE PREFERRED EMBODIMENTS

In power station plants with combined heat and power or with steam consumers such as, for example, burner systems with steam injection for the reduction of pollutants or for raising output, up to 100% of water, relative to the quantity of steam taken, in the water-steam circulation can be consumed. Accordingly, make-up water must be continuously added to the water-steam circulation, but this must first be adapted to the physical properties of the condensate in a condenser. The two criteria discussed here are, on the one hand, the quantity of the inert gases dissolved in the make-up water and, on the other hand, the temperature. A characteristic of the quantity of inert gas dissolved in the make-up water is the starting concentration of $O_2$ of 10,000 ppb (parts per billion) under ambient conditions. Before the make-up water enters the water-steam circulation of a power station plant, this concentration value must be lowered down to a single-digit ppb value.

The deaeration takes place in two stages, and it starts with the flash deaeration immediately after the make-up water has been sprayed into a vacuum chamber. The almost explosive stripping of inert gas contents, which occurs here, can be characterized by describing it as a "Champagne effect". In an optimum manner in thermal engineering terms, the deaeration of make-up water is subsequently carried out in a second phase in the saturated state merely under material kinetics. This means that stripping steam and make-up water are brought together at the same temperature in a gas/liquid-contacting apparatus in such a way that the dissolved gases are stripped out by diffuse transport through the gas/liquid boundary layer. It can be deduced from this that the two processes of heating and deaeration of the make-up water proceed in an optimized manner in energy terms and hence also in economic terms, whenever they are carried out separately from one another. The process sequence of the make-up water treatment thus starts with heating, until the saturation conditions have approximately been reached, and it ends with the deaeration on a merely material-kinetic basis before the treated water is mixed with the condenser condensate.

Since the two processes of heating and deaeration of large quantities of make-up water proceed largely in isolation and one after the other, the description is structured in a similar way with reference to the drawing.

Heating of the Make-up Water

The heating of the make-up water, with a subcooling of 18 K. and more, takes place essentially in three stages. In each stage the make-up water flows through a device in which it is heated by convective heat transfer whereby heat from low-energy steam from a condenser is transferred to the make-up water flowing through that device. As shown in FIG. 1, the make-up water is passed over a feed line 2 to a 3-way valve 1 and divided there initially into a smaller and a larger part stream. The larger part stream of the make-up water comprises about 90% of the total flow, and the smaller part correspondingly amounts to about 10%.

The smaller part stream is fed to a vertically arranged condenser-stripper 3 which has two mutually separate space regions. One space region comprises two domes 3a, 3b which confine the condenser-stripper at the top and at the bottom and are each sealed and connected to one another via vertical tubing 4. The second space region is located between the sealed domes 3a and 3b and is confined by the inner wall of the apparatus of the condenser-stripper 3. The smaller part stream is introduced into the upper dome 3a and flows in the vertically arranged tubing 4 to the lower dome 3b. On the shell side, stripping steam is passed through the tubing 4 in the flow direction opposite to that of the make-up water flowing on the inside wall. The stripping steam is here enriched with inert gases of the make-up water. It flows through a steam inlet branch 7 above. the lower dome 3b into the condenser-stripper 3 and is driven by a suction device 27 which is connected below the upper dome 3a to a suction branch 6 located there. Due to the subcooling of the make-up water in the tubing 4, the stripping steam is almost fully condensed and separated from the inert gases. This process is enhanced by a baffle 5 in the upper region of the condenser-stripper 3, that is to say in the vicinity of the upper dome 3a. After this phase separation, the fully condensed stripping steam collects as condensate 8 above the dome 3b and the inert gases with a small residual steam fraction are removed from the system by the suction device 27. As a result of this almost complete condensation, the stripping steam is advantageously preserved for the water-steam circulation, the make-up water in the tubing 4 is heated and the suction device 27 remains virtually unaffected by the volumetric flow of steam.

The preheated, smaller part stream of the make-up water is then added again to the larger part stream at a mixing point 28. The total make-up water then flows through an inlet branch 10 into a likewise vertically arranged device which has three regions over its vertical longitudinal extent. The lower part is formed as a steam inflow chamber 14 which is closed downwards by a dome. The dome here acts as a receiver 16 for heated and deaerated make-up water. The steam inflow chamber 14 is adjoined upwards by a tube-type falling-film heat exchanger 11 which is defined by two sealing plates 11a, 11b and the wall of the device and contains vertically arranged tubing 13 between the sealing plates 11a, 11b. This tubing 13 connects the lower steam inflow chamber 14 to a packed column 23 which is located above the tube-type falling-film heat exchanger 11 and is surrounded by a jacket-type film heat exchanger 22.

As already mentioned, the total stream of the make-up water, preheated by the part stream, thus flows through the inlet branch 10 on the shell side of the tubing 13 into the tube-type falling-film heat exchanger 11. The make-up water flows from the inlet branch 10, located at the lower end of the tube-type falling-film exchanger 11, to the discharge branch 21 at the upper end. The vertically upward-passing flow path of the make-up water is lengthened by baffles 12 arranged horizontally in the tube-type falling-film heat exchanger 11. The residence time for the heating of the make-up water in the tube-type falling-film heat exchanger 11 is thus also extended. The heating is effected by means of low-energy waste steam which is fed via a horizontal steam line 15 from a condenser 19 to the steam inflow chamber 14. The steam is passed upwards through the tubing 13 and thus heats a water film falling down in the tube-type falling-film heat exchanger 11. This water film then transfers its heat content partially via the tube walls of the tubing 13 further to the make-up water flowing on the shell side.

The last heating stage for make-up water takes place in the already mentioned jacket-type film heat exchanger 22 which is connected above the tube-type falling-film heat exchanger 11. For this purpose, the make-up water first flows from the discharge branch 21 through a line into a lower ring header 22*a* belonging to the jacket-type film heat exchanger 22. From there, the make-up water is driven through a gap of 4 to 7 mm up to an upper ring header 22*b*, a heat transfer taking place from the jacketed packed column 23 to the jacket-type film heat exchanger 22. With this stage, the heating of the make-up water is concluded. On the exit side, the make-up water is now approximately in the state of saturation, that is to say the temperature difference between the exit steam from the condenser and the heated make-up water taking account of the pressure drops on the steam side, is now only about 0.5 K.

Deaeration of the Heated Make-up Water

The deaeration of the heated make-up water starts with it being sprayed in above the packed column 23 by means of a spray device 24, which is connected to the upper ring header 22*b*, and thus being deaerated by means of spontaneous expansion. At the same time, a condensate 8 from the condenser-stripper 3 via a condensate drain 9 is sprayed in through the spray device. According to the countercurrent principle, the make-up water trickling down from above and the exit steam flowing from below meet in the packed column 23. In this way, the material-kinetic deaeration is initiated and maintained. The state of saturation of the make-up water allows easy stripping of the dissolved inert gases, as has already been discussed above. Since the packed column is used here exclusively according to its function as a deaerator, its diameter and packed volume should comparatively be sized markedly smaller than in devices in which the packed column is intended both to heat and to deaerate. With respect to the volume, the packed column used here is about 75% smaller than a packed column for a forced double function. Such a smaller packed column is of course correspondingly cheaper, the risk of flooding, such as can occur when packed columns are fed with subcooled make-up water, being completely precluded.

The make-up water trickling out of the packed column and partially deaerated therein is then, by means of a film-generating device 20, via a falling film in the tubes of the tubing 13 heated again by means of steam, since it has given up heat energy in the packed column 23. For further deaeration, the make-up water heated in the falling film in the tubes collects in the dome of the steam inflow chamber 14. From there, the make-up water is fed to a trough 17 on a condenser wall which then feeds the make-up water by means of a film-generating device 18 along a falling film on a wall to the condenser condensate. This measure effects the final deaeration of the make-up water which now shows the characteristic $O_2$ concentration of about 5 ppb, it having to be remembered that all the further dissolved gases, such as $N_2$, $CO_2$ and the like, have likewise been stripped out.

The exit steam coming from the condenser and used for heating and deaeration carries all the stripped-out gases along above the spray device 24 through a steam line into the condenser-stripper. As already explained, a separation of the stripped-out gases and the stripping steam takes place here by a condensation which is simultaneously utilized for the heating of sub-cooled make-up water.

Figure 2:
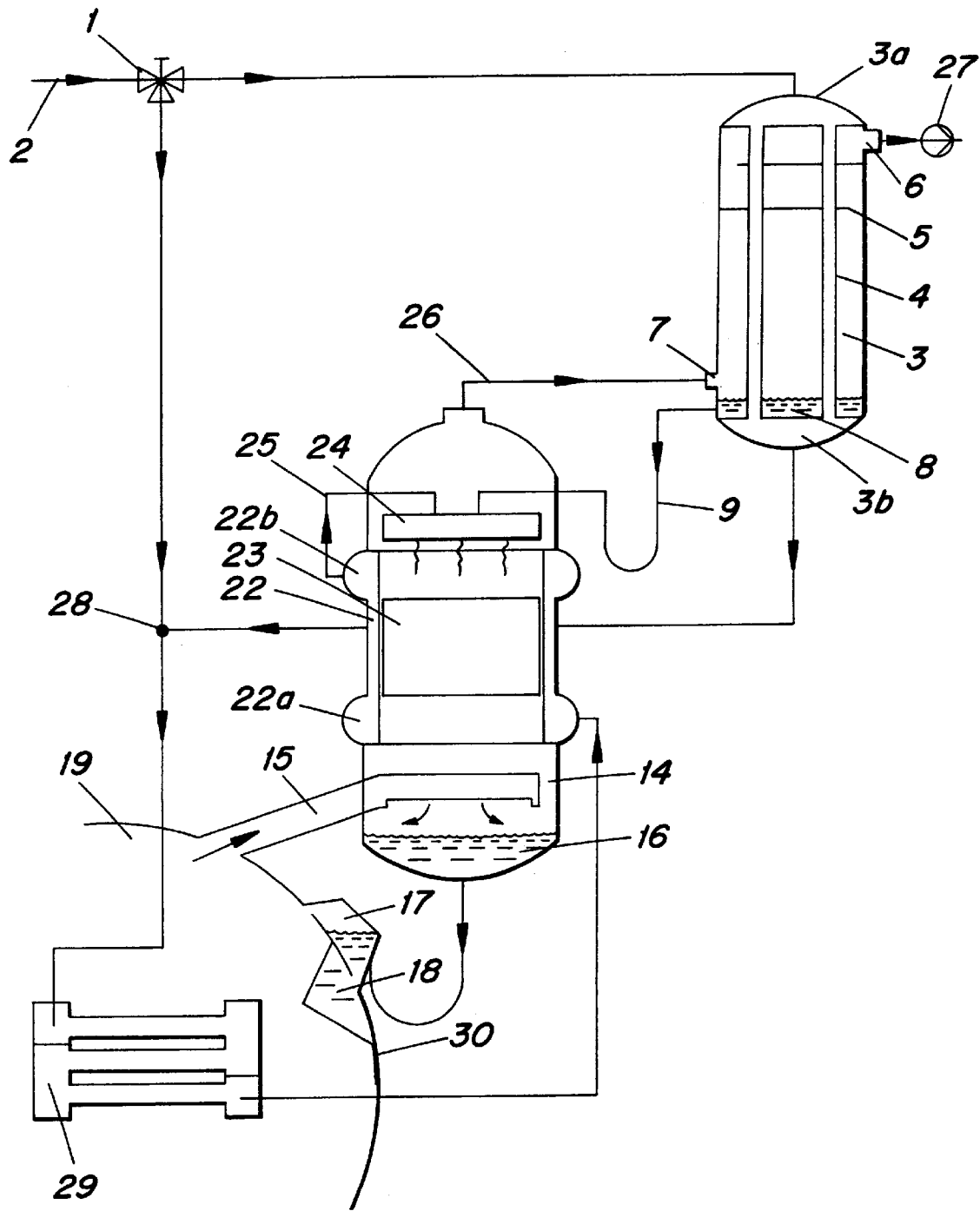
FIG. 2 shows an embodiment variant of the invention.

A second embodiment according to the invention is shown in FIG. 2. The essential difference as compared with the first exemplary embodiment is the procedure for heating. The heating of the make-up water is in this case carried out substantially in an additional tube bundle 29 of the condenser 19, which replaces the tube-type falling-film heat exchanger 11. This tube bundle 29 can here be designed as an integrated constituent of the condenser tubing. The cooling water used in a condenser 19 has, on the outflow side, as a rule a terminal temperature difference of 2 to 3 K. with respect to the exit steam temperature. Since the make-up water fed to the additional tube bundle 29 is 2 to 3 K. warmer than cooling water, this make-up water approximately has the desired saturation on the outflow side.

The preheating according to this second exemplary embodiment is, however, preferably applicable only in the case of a new plant project, whereas the first exemplary embodiment according to FIG. 1 can also be applied in existing power station plants.

A decisive advantage of the embodiments according to the invention is that, in spite of the large quantity of make-up water, only one suction device 27 is required for providing the necessary driving potential as a result of the optimized utilization of the heating and deaerating measures and in suitable devices in accordance with the present invention.

Of course, the invention is not limited to the exemplary embodiment shown and described. According to the invention, for example a combination of heating by means of the tube bundle 29 and the tube-type falling-film heat exchanger 11 is also conceivable. A substitution of the packed column in FIG. 2 by a falling-film deaerator would also be a variant according to the invention.

Numerous modifications and variations of the present invention are possible in the light of the above teachings. It is therefore to be understood that, within the scope of the appended claims, the invention may be practised otherwise than as specifically described herein.

What is claimed is:

1. An arrangement for preheating and deaerating make-up water in a power generation plant by means of steam, comprising:

at least one convective heat transfer device for heating said make-up water;

at least one make-up water deaerator selected from the group consisting of a packed column and a falling-film deaerator; and at least one condensing device for said steam in fluid communication with both said at least one convective heat transfer device and said at least one make-up water deaerator.

2. The arrangement as claimed in claim 1, wherein said at least one connective heat transfer device comprises a falling-film heat exchanger, a jacket-type heat exchanger, and a condenser-stripper; and said at least one make-up water deaerator comprises a series arrangement of a packed column, a tube-type falling-film deaerator, and a wall-type falling-film deaerator.

3. The arrangement as claimed in claim 2, wherein said falling-film heat exchanger comprises baffles facing a direction of the flow of the make-up water;

said packed column is surrounded by said jacket-type heat exchanger; and said condenser-stripper comprises battles facing a direction of flow of steam exiting said condenser-stripper.

4. The equipment arrangement as claimed in claim 1, wherein said at least one convective heat transfer device comprises a condenser-stripper, a condenser, a separately arranged tube bundle, and flow lines for passing said make-up water from said condenser-stripper to said tube bundle.

* * * * *